Figure 1:
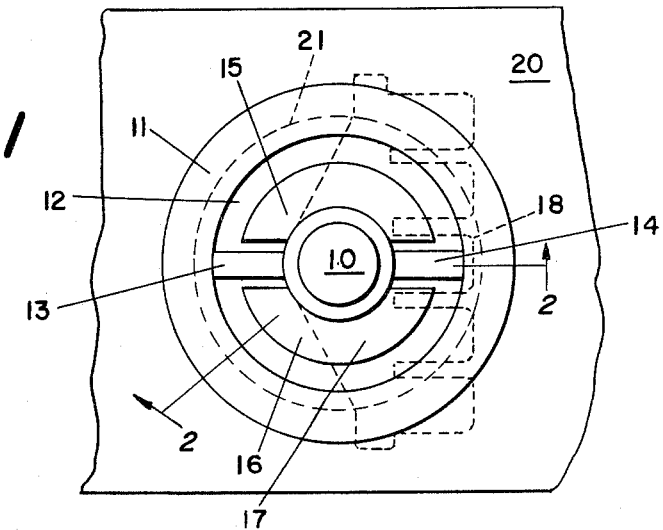

Jan. 11, 1966 E. C. WEIDNER 3,228,804
ELECTRIC STORAGE BATTERY TERMINAL POST AND COVER ASSEMBLY
Filed July 29, 1963

United States Patent Office

3,228,804
Patented Jan. 11, 1966

3,228,804
ELECTRIC STORAGE BATTERY TERMINAL POST AND COVER ASSEMBLY
Evert C. Weidner, Philadelphia, Pa., assignor to The Electric Storage Battery Company, a corporation of New Jersey
Filed July 29, 1963, Ser. No. 298,365
5 Claims. (Cl. 136—168)

This invention relates to an electric storage battery terminal post and cover assembly and a method for sealing it, and in particular, it relates to an improved terminal post and cover assembly which can be sealed without placing the electrode plate load on the sealant.

In the manufacture of electric storage batteries, it is necessary to seal the terminal posts projecting through the battery container in order to prevent leakage of electrolyte around the terminal post. In conventional battery container constructions, wells are provided around the terminal posts in the battery cover and a sealing compound such as an epoxy resin is poured into each well and allowed to set around the terminal posts. One of the problems associated with this type of construction is the rupture of the sealant material around the terminal post and the consequent electrolyte leakage. It has been determined that one of the principal causes of sealant rupture is the placing of the electrode plate load on the sealant by having it support the terminal post and electrode plates. This problem is particularly prevalent in electric storage batteries having large and heavy electrode plates.

It is an object of this invention to provide an electric storage battery terminal post and cover assembly which substantially eliminates or greatly reduces sealant rupture around the terminal post.

Another object of the invention is to provide an easy method for assembling and sealing a terminal post in a battery container cover.

Figure 2:
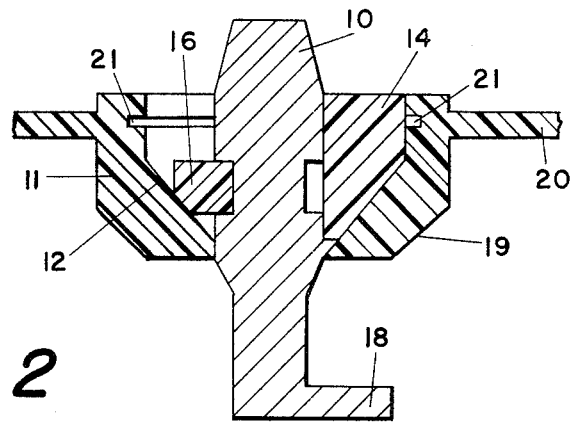

Other objects and purposes of this invention will be apparent to those skilled in the art in view of the following description and in particular by referring to the drawings in which:

FIGURE 1 is a top view of a terminal post-battery cover assembly in accordance with a preferred embodiment of this invention; and FIGURE 2 is a sectional view taken along line 2—2 of FIGURE 1.

It has been discovered that the problem of ruptured sealant around a battery terminal post can be substantially eliminated or greatly reduced by providing in the battery container cover a well having a beveled bottom and specially designed support means disposed in the well which engage and support the terminal post. In accordance with this invention, the support means consists of two semicircular elements which are inserted into opposite sides of a cover well. In carrying out this invention, the terminal post is grooved around its periphery and the semicircular supporting elements are designed so that they fit into the groove in the terminal post and engage the post therein. The supporting elements are forced around the terminal post by the weight of the electrode plates as exerted by the terminal post and the beveled well bottom. In this manner, the load of the electrode plates is supported by the two semicircular elements and the bevelled well bottom. The space in the well above, around and beneath the semicircular support elements is filled with a sealant such as an epoxy resin which effectively seals the terminal post, but in accordance with this invention the sealant does not have to serve the additional function of supporting the terminal post.

An additional feature of this invention, and in accordance with a preferred embodiment thereof, comprises inserting two projections into the interior of the cover well and on opposite sides thereof which are securely attached to the sides and beveled bottom of the well. These projections are designed and positioned to engage or abut opposite sides of the terminal post projecting through the cover well and in addition divide the well and beveled well bottom into semicircular sections adapted to receive the semicircular supporting elements. It should be noted that the projections should engage the terminal post in a particular manner, i.e. they should lie in a plane substantially parallel to the electrode plates attached to the terminal post which prevents the terminal post from pivoting or moving about the semicircular supporting elements as it would tend to do due to the weight of the electrode plates. It is apparent that instead of inserting two projections as described above, the well can be molded so as to have two projections as an integral part thereof.

The terminal post-battery container cover assembly of this invention may be more specifically described by referring to the drawings. In FIGURE 1, which is a top view of a preferred embodiment, there is illustrated a battery terminal post 10 which projects through a cover well 11 having a beveled bottom 12 located in the electric storage battery container cover 20. Firmly attached to opposite sides of the interior of said cover well 11 are projecting elements 13 and 14 which abut terminal post 10 and which divide the interior of said cover well 11 into 2 semicircular sections. In each semicircular section there are placed semicircular supporting members 15 and 16 which abut the beveled bottom of the cover well 11 and engage battery terminal post 10. The semicircular supporting members may be made from a rigid plastic as illustrated or any other electrolyte resistant material. The battery terminal post 10 comprises a conventional pillar-strap 17 having projections 18 at one side for connection with a plurality of electrode plates of the same polarity. It should be noted that the cover well projections 13 and 14 are disposed substantially parallel to the electrode plates which are attached to the terminal post projections 18.

FIGURE 2 is a cross section of FIGURE 1 taken along line 2—2 of FIGURE 1 and corresponding parts have identical numerical indicators. In FIGURE 2, it can be seen that the top of the terminal post 10 is tapered, and in addition, that there is a groove 19 around the periphery of the terminal post. The semicircular supporting member 16 abuts the beveled bottom 12 of the cover well 11 and also engages the terminal post 10 in the groove 19. After the parts are assembled as shown in FIGURE 2, a sealing composition such as an epoxy resin is poured into the cover well 11 and fills the void volumes above, around and beneath the supporting member 16, in the terminal post groove 19 which is not occupied by the supporting member 16 and in the cover well groove 21 located in the interior periphery of the cover well. The cover well groove 21 is not essential but helps to anchor the sealant after it has hardened.

As previously indicated, the terminal post-battery container cover assembly is readily assembled and easily sealed in accordance with the procedures of this invention. The semicircular supporting elements are inserted into the cover wells and the cover is slipped over the terminal posts to which are attached the electrode plates and the terminal posts are inserted into the cover well. The tapered top of the terminal post pushes the supporting elements aside until the post has been inserted far enough into the cover well for the supporting elements to slide down the beveled well bottom into the groove around the terminal post. Thereafter, any support given to the electrode plates can be withdrawn, and the terminal posts with attached plates will hang by the semicircular supporting elements. Then the sealing composition can be poured into the cover well, and the cover and electrode plates inserted into the battery container for final assembly.

Having completely described this invention, what is claimed is:

1. An electric storage battery terminal post and cover assembly comprising (a) an electric storage battery container cover having a well therein, said cover well having a beveled bottom, (b) a battery terminal post inserted into said cover well and projecting therethrough, said terminal post having a groove around its periphery and said groove being positioned within said cover well, and (c) two semicircular supporting elements inserted into opposite sides of said cover well, said supporting elements being designed and positioned so as to fit into said groove in said terminal post.

2. An electric storage battery terminal post and cover assembly in accordance with claim 1 in which there is a groove around the interior periphery of said cover well.

3. An electric storage battery terminal post and cover assembly in accordance with claim 1 having electrode plates attached to said terminal post and further including two projecting elements firmly attached to opposite sides of the interior of said cover well, said projecting elements disposed between said semicircular supporting elements and having their interior ends in contact with said terminal post, and said projections lying in a plane substantially parallel to the electrode plates.

4. An electric storage battery terminal post and cover assembly in accordance with claim 3 in which the interior periphery of said cover well includes a groove adapted to receive and anchor a sealant.

5. An electric storage battery terminal post and cover assembly in accordance with claim 3 in which the top of said terminal post is tapered.

References Cited by the Examiner

UNITED STATES PATENTS

| 1,453,791 | 5/1923 | Gossling | 136—168 |
| 1,460,895 | 7/1923 | Doughty et al. | 136—168 |
| 1,472,391 | 10/1923 | Ford | 136—168 |

WINSTON A. DOUGLAS, *Primary Examiner.*

ALLEN B. CURTIS, *Examiner.*

D. L. WALTON, *Assistant Examiner.*